United States Patent
Suzuki et al.

(10) Patent No.: US 7,893,120 B2
(45) Date of Patent: Feb. 22, 2011

(54) METHOD FOR RECLAIMING PULVERIZED SYNTHETIC RESIN PRODUCT

(75) Inventors: Yoshiki Suzuki, Tokyo (JP); Tatsushi Ako, Osaka (JP); Yukimasa Tanaka, Osaka (JP); Saburou Hinenoya, Osaka (JP); Yasuo Kita, Osaka (JP)

(73) Assignee: UBE Industries, Ltd., Ubi-shi, Yamaguchi (JP)

( * ) Notice: Subject to any disclaimer, the term of this patent is extended or adjusted under 35 U.S.C. 154(b) by 145 days.

(21) Appl. No.: 12/025,354

(22) Filed: Feb. 4, 2008

(65) Prior Publication Data

US 2008/0132590 A1    Jun. 5, 2008

Related U.S. Application Data

(63) Continuation of application No. 10/475,983, filed as application No. PCT/JP2003/04651 on Apr. 11, 2003, now abandoned.

(30) Foreign Application Priority Data

May 9, 2002 (JP) .............................. 2002-134288
Jun. 27, 2002 (JP) .............................. 2002-188255

(51) Int. Cl.
*C08J 11/04* (2006.01)
(52) U.S. Cl. ................... 521/40; 521/40.5; 521/41; 521/41.5; 521/42; 521/42.5; 521/43; 521/43.5; 521/44; 521/44.5; 521/45; 521/45.5; 521/46; 521/46.5; 521/47; 521/47.5; 521/48; 521/48.5; 521/49; 521/49.5; 521/49.8

(58) Field of Classification Search ........... 521/40–49.8
See application file for complete search history.

(56) References Cited

U.S. PATENT DOCUMENTS

| | | | |
|---|---|---|---|
| 4,820,469 A | 4/1989 | Walsh et al. |
| 5,122,398 A | 6/1992 | Seiler et al. |
| 5,157,082 A | 10/1992 | Johnson |
| 6,143,405 A | 11/2000 | Palmgren |

FOREIGN PATENT DOCUMENTS

JP    2000-327896    11/2000

OTHER PUBLICATIONS

International Preliminary Examination Report dated Feb. 17, 2005 for Application No. PCT/JP03/04651.

*Primary Examiner*—Edward J Cain
(74) *Attorney, Agent, or Firm*—Nixon Peabody LLP; Jeffrey L. Costellia

(57) ABSTRACT

A pulverized thermoplastic resin product such as a pulverized thermoplastic product containing a black pigment, a mixture of a pulverized thermoplastic product containing a colored pigment and a pulverized thermoplastic product containing a colored pigment, or a pulverized thermoplastic product containing two or more different colored pigments can be converted into colored reclaimed resin particles by a method comprising the steps of mixing the pulverized resin product with a white pigment and a black pigment, melting the resulting mixture, and converting the molten mixture into solid particles. The colored reclaimed resin products can be utilized in various field.

10 Claims, No Drawings ated.
METHOD FOR RECLAIMING PULVERIZED SYNTHETIC RESIN PRODUCT

FIELD OF INVENTION

The present invention relates to a method for reclaiming a synthetic resin product that is colored with a black or colored pigment. In more detail, the invention relates to a technology for converting a pulverized synthetic resin product that is colored with a black or colored pigment, which is obtainable, for instance, from parts of automobile or parts of household electric appliances.

PRIOR ART

Recently, it is desired to reclaim or recycle synthetic resin products represented by parts of automobile or parts of household electric appliances so as to obviate environmental disruption. Accordingly, many industrial companies have studied methods for efficiently reclaiming these synthetic resin products. Since most of synthetic resin products comprise a thermoplastic resin, most known method for reclaiming synthetic resin products comprises the steps of pulverizing the synthetic product to prepare a pulverized product, heating the pulverized product to give a molten product, and converting the molten product into solid particles.

The synthetic resin products mentioned above are generally named waste plastic materials. Most of the waste plastic materials are colored with a black pigment to show a black or gray surface, or with colored pigments such as a red pigment, a blue pigment and a yellow pigment to show a colored surface. In most cases, the colored products have various colorings or patterned or partial coloring. In some cases, coloring of the colored synthetic resin products used for a certain period is faded and varies from the original coloring. Accordingly, when the pulverized synthetic resin product is melted and converted into reclaimed resin particles, the resulting resin particles necessarily show black or gray surfaces. Therefore, thus produced resin material having black or gray surface can be re-used only for manufacturing black or gray resin articles.

DISCLOSURE OF INVENTION

The inventors of the present invention have discovered that a pulverized thermoplastic resin product which is selected from the group consisting of a pulverized thermoplastic product containing a black pigment, a mixture of a pulverized thermoplastic product containing a black pigment and a pulverized thermoplastic product containing a colored pigment, and a pulverized thermoplastic product containing two or more different colored pigments can be converted into reclaimed resin particles having the desired coloring by the steps of mixing the pulverized product with a light-shielding white pigment and a colored pigment having a hue for adjusting the coloring of the reclaimed resin, melting the mixture, and converting the molten mixture into solid particles. The invention has been complete based on the above-mentioned discovery.

Accordingly, the present invention resides in a method for producing reclaimed resin particles which comprises the steps of preparing a molten product which comprises a mixture of a white pigment, a colored pigment, and a pulverized thermoplastic resin product to be reclaimed which is selected from the group consisting of a pulverized thermoplastic product containing a black pigment, a mixture of a pulverized thermoplastic product containing a black pigment and a pulverized thermoplastic product containing a colored pigment, and a pulverized thermoplastic product containing two or more different colored pigments, and converting the molten product into solid particles.

The step of preparing a molten product involved in the present invention is preferably performed by mixing the pulverized resin product to be reclaimed with a white pigment and a colored pigment and then melting the mixture by heating. However, the step can be carried out by preliminarily heating and melting the synthetic resin product to be reclaimed and then adding the white pigment and the colored pigment to the molten product during the heating procedure or a cooled product after once terminating the procedure of heating the molten product. Subsequently, the resulting mixture is heated and melted. The molten product can be converted into solid particles by producing particles of the molten product and cooling them, or by cooling the molten product as such and then pulverizing the cooled product.

DETAILED DESCRIPTION OF INVENTION

Preferred embodiments of the invention are described below.

(1) A black pigment is incorporated into the mixture in the step of preparing a molten product.

(2) An inorganic filler is incorporated into the mixture prepared in the step of preparing a molten product.

(3) A thermoplastic resin is incorporated into the mixture prepared in the step of preparing a molten product.

(4) A thermoplastic resin and an elastomer are incorporated into the mixture prepared in the step of preparing a molten product.

(5) The pulverized thermoplastic resin product to be reclaimed is a pulverized bumper or interior trim which is taken from an automobile and has no skin film.

(6) The pulverized thermoplastic resin product to be reclaimed comprises a thermoplastic resin selected from the group consisting of polyolefin, polyester, polystyrene, ABS resin, and polyamide.

(7) The pulverized thermoplastic resin product to be reclaimed contains an elastomer.

(8) Colored reclaimed resin particles produced by the above-mentioned method of the invention.

(9) A method for manufacturing a colored resin article which comprises the steps of melting the reclaimed resin particles of (8) above under heating and molding the molten resin.

The method of the invention for reclaiming pulverized synthetic resin product is characterized in that a combination of a light-shielding white pigment and a colored pigment, and optionally a thermoplastic resin, an elastomer, and a filler, are added to the pulverized synthetic resin product.

In the method of the invention, 0-99 wt. % of a thermoplastic resin, 0-40 wt. % of an elastomer, and 0-50 wt. % of a filter is added to 1-100 wt. % of the pulverized product (total amount of the pulverized product, polyolefin, elastomer, and/or filler reach 100 wt. %). To 100 weight parts of the pulverized product are added 0.01-20 weight parts, preferably 0.05-15 weight parts, more preferably 0.15-12 weight parts, more preferably 0.2-12 weight parts, most preferably 0.25-10 weight parts, of each of a white pigment and a colored pigment.

In the invention, the addition of a component selected from a thermoplastic resin, an elastomer, and a filler is preferred, because physical properties such as mechanical performance of a resin article manufactured in the reclaiming method of the invention is improved.

Examples of the pulverized synthetic resin products to be reclaimed in the invention include pulverized resin material wastes produced in resin molding and resin processing, used instrument panels, interior and exterior parts such as bumpers and plastic material parts of used automobiles, used household electric appliances, industrial material parts, and building materials. The method of the invention is preferably employed for reclaiming pulverized resinous parts of used automobiles such as instrument panels, bumpers and plastic material parts, household electric parts, industrial materials, and materials employed for building houses. It is preferred that from the pulverized synthetic resin products to be reclaimed, cured resin films (coated films) are previously removed.

The pulverized synthetic resin product to be reclaimed in the invention can be a pulverized resin product waste which is obtained from a mixture of a thermoplastic resin product from which a cured resin skin film (resinous film prepared by curing a resin coat of a curable resin such as acryl resin, urethane resin, unsaturated polyester resin, alkyd-melamine resin, or acrylmelamine resin by the use of heat, light (including ultra-violet rays)) has been removed by physical or chemical processing, water, a solvent, a curing catalyst, and the like.

Examples of the thermoplastic resin materials employable in the method of reclaiming the pulverized resin product are olefinic resins, polycarbonate resins, polyurethane resins, styrene resins, ABS resins (acrylonitrile-butadiene-styrene resins), polyester resins such as polybutylene terephthalate and polyethylene terephthalate, polyphenyl ether resins such as modified polyphenylene ether and polyphenylene sulfide, polyacryl resins such as poly(methyl methacrylate), polyamides such as 6-nylon, 66-nylon, 12-nylon, and 6,12-nylon, and polysulfones. The pulverized synthetic resin product can be a pulverized product comprising a thermoplastic resin and an elastomer. The pulverized synthetic resin product can be in the form of pellets.

Representative examples of synthetic resin products to be claimed include bumpers recovered from automobiles. There are no specific limitation with respect to the recovered bumpers. However, it is preferred that the recovered bumper comprises a crystalline propylene resin, an elastomer, and a pigment. For instance, it is specifically preferred that the recovered bumper comprises 40-90 wt. % of a crystalline propylene resin, 10-60 wt. % of an elastomer, and 0-20 wt. % of other resin materials. The recovered bumper can contain pigments such as carbon black and titanium dioxide. A recovered bumper containing both of carbon black and titanium dioxide is favorably reclaimed according to the invention. The recovered bumper preferably comprises 100 weight parts of plastic components (resinous component+elastomer component), and not more than 2 weight parts, preferably not more than 1.5 weight parts, more preferably not more than 1 weight part, most preferably not more than 0.6 weight part, of carbon black. The recovered bumper preferably contains not more than 1.5 weight parts (based on 100 weight parts of the plastic components), more preferably not more than 1 weight part, more preferably not more than 0.5 weight part, most preferably not more than 0.3 weight part, of a pigment other than carbon black. In addition, the recovered bumper may contain not more than 50 weight parts (based on 100 weight parts of the plastic components), preferably not more than 40 weight parts, more preferably not more than 30 weight parts, most preferably not more than 20 weight parts, of a filler such as talc. The recovered bumper preferably comprises a thermoplastic resin showing a melt flow rate (MFR, measured according to ASTM D1238, at a temperature of 230° C. and a weight of 2.16 kg) of 1-100 g/10 min., more preferably 3-70 g/10 min., most preferably 5-50 g/10 min.

The pulverized synthetic resin product generally comprises particles having a diameter of not larger than 30 mm, preferably 1-30 mm, more preferably 1-25 mm, more preferably 1-20 mm, most preferably 1-12 mm. The pulverized synthetic resin product can be melted and molded in a heated extruder to give pellets. These pellets can be utilized in the invention in place of the pulverized product.

The pulverized synthetic resin product containing a black pigment which can be reclaimed in the invention preferably is a black or gray pulverized product showing $L^*$ of not higher than 28.00, $a^*$ of −1.00 to 0.40, and $b^*$ of −1.50 to 0.50. Preferably, the pulverized product shows $L^*$ of 20.00 to 37.00, $a^*$ of −1.00 to 0.40, and $b^*$ of −1.50 to 0.60. More preferably, the pulverized product shows $L^*$ of 23.00 to 36.00, $a^*$ of −0.70 to 0.10, and $b^*$ of −1.20 to 0.20. More preferably, the pulverized product shows $L^*$ of 23.00 to 33.00, $a^*$ of −0.70 to 0.10, and $b^*$ of −1.20 to 0.20. Particularly preferably, the pulverized product shows $L^*$ of 23.00 to 28.00, $a^*$ of −0.70 to 0.10, and $b^*$ of −1.20 to 0.20.

It is preferred that the colored reclaimed resin particles have color characteristics of $L^*$=28.00 to 68.00, $a^*$=−8.00 to 7.00 and $b^*$=−12.00 to 20.00.

Examples of the white pigments employable for incorporation into the pulverized synthetic resin product include titanium dioxide, white lead, and zinc oxide. Most preferred is titanium dioxide.

Any of known titanium dioxide pigments can be employed with no specific limitations. For instance, titanium dioxide prepared by the chlorine method or sulfuric acid method can be employed. Preferred is titanium dioxide prepared by the chlorine method. There are no specific limitations with respect to the forms of the particles. Titanium dioxide of tetragonal type, rutile type, or anatase type can be employed. Preferred are titanium dioxide of the tetragonal type or rutile type. There is no limitation with respect to mean size of the particles. It is preferred that the mean particle size is within 0.01-0.5 μm, more preferably 0.05-0.5 μm, more preferably 0.1-0.4 μm, and particularly preferably 0.2-0.3 μm, because these particles are satisfactory in dispersability and handling. There is no limitation with respect to DOP absorption of the titanium dioxide. It is preferred that the DOP absorption is within 5-40 cc/100 g, more preferably 8-30 cc/100 g, more preferably 10-20 cc/100 g, and most preferably 12-18 cc/100 g.

Any of known colored pigments can be employed in the invention. Examples include inorganic pigments such as oxides, hydroxides, sulfides, chromates, carbonates, sulfates and silicates of metal; and organic pigments such as azo compounds, diphentylmethane compounds, triphenylmethane compounds, phthalocyanine compounds, nitro compounds, nitroso compounds, anthraquinone compounds, quinacridone red compounds, benzidine compounds, and fused polycyclic compounds. Also employable are colored fibers and metal particles. There is no specific limitation with respect to hue of the colored pigment. Any of yellow pigments, blue pigments, red pigments, and green pigments can be employed. The pigments can be employed in combination of two or more.

Examples of the colored pigments employable in the invention include inorganic pigments such as iron oxide red, cadmium red, cadmium yellow, ultramarine blue, cobalt blue, titanium yellow, red lead, yellow lead, prussian blue, zinc sulfide, chromium yellow, barium yellow, cobalt blue, and cobalt green; organic pigments such as quinacridone red, polyazo yellow, anthraquinone red, anthraquinone yellow, polyazo red, azo lake yellow, perylene, phthalocyanine blue, phthalocyanine green, isoindolinone yellow, watchung red, permanent red, para red, toluidine maroon, benzidine yellow, fast sky blue, and brilliant carmine 6B; colored fibers, and glossy metal particles. The pigments can be employed in combination of two or more.

There is no specific limitation with respect to mean size of the titanium yellow. It is preferred that the mean size is within 0.1-1.5 μm, more preferably 0.5-1.3 μm, more preferably 0.7-1.1 μm, and most preferably 0.8-1 μm, because they are satisfactory in dispersability and handling. There is no specific limitation with respect to DOP absorption of the titanium yellow. It is preferred that the DOP absorption is within 15-40 cc/100 g, more preferably 20-35 cc/100 g, and most preferably 20-30 cc/100 g. There is no specific limitation with respect to pH of the titanium yellow. Preferred is pH 6-10, and pH 7-9 is most preferred.

There is no specific limitation with respect to mean size of the ultramarine blue. It is preferred that the mean size is within 0.1-5 μm, more preferably 0.5-4 μm, more preferably 0.8-3.5 μm, and most preferably 1-3 μm, because they are satisfactory in dispersability and handling. There is no specific limitation with respect to DOP absorption of the ultramarine blue. It is preferred that the DOP absorption is within 20-50 cc/100 g, more preferably 25-40 cc/200 g, and most preferably 30-35 cc/100 g. There is no specific limitation with respect to pH of the ultramarine blue. Preferred is pH 5-11. pH 5.5-11 is more preferred, and pH 7-11 is most preferred.

As for the phthalocyanine blue, any of known phthalocyanine blue pigments can be employed. For instance, those produced by the Waller process or the phthalonitrile process can be employed. There is no specific limitation with respect to form of the phthalocyanine blue. Phthalocyanine blue pigments of α-type and β-type can be employed. There is no specific limitation with respect to mean size of the phthalocyanine blue. It is preferred that the mean size is within 0.01-2 μm, more preferably 0.05-1.5 μm, more preferably 0.1-0.4 μm, and most preferably 0.1-1 μm.

As for the phthalocyanine green, any of known phthalocyanine green pigments can be employed. For instance, those produced by the Waller process or the phthalonitrile process can be employed. There is no specific limitation with respect to form of the phthalocyanine green. Phthalocyanine green pigments of α-type and β-type can be employed. There is no specific limitation with respect to mean size of the phthalocyanine green. It is preferred that the mean size is within 0.01-2 μm, more preferably 0.05-1.5 μm, more preferably 0.1-0.4 μm, and most preferably 0.1-1 μm. There is no specific limitation with respect to pH of the phthalocyanine green. Preferred is pH 4-9, and pH 4-8 is more preferred.

As for the iron oxide red, any of known iron oxide red pigments can be employed. There is no specific limitation with respect to form of the iron oxide red. Iron oxide red pigments of isometric system can be employed. There is no specific limitation with respect to mean size of the iron oxide red. It is preferred that the mean size is within 0.01-1 μm, more preferably 0.05-0.5 μm, more preferably 0.08-0.4 μm, most preferably 0.1-0.3 μm. There is no specific limitation with respect to DOP absorption of the iron oxide red. It is preferred that the DOP absorption is within 10-50 cc/100 g, more preferably 12-40 cc/100 g, and most preferably 15-30 cc/100 g. There is no specific limitation with respect to pH of the iron oxide red. Preferred is pH 4-8, and pH 5-7 is more preferred.

As for the quinacridone red, any of known quinacridone red pigments can be employed. There is no specific limitation with respect to form of the quinacridone red. Quinacridone red pigments of α-type, β-type and γ-types can be employed. There is no specific limitation with respect to mean size of the quinacridone red. It is preferred that the mean size is within 0.01-2 μm, more preferably 0.05-1.5 μm, and most preferably 0.1-1 μm.

As for the anthraquinone red, any of known anthraquinone red pigments can be employed. There is no specific limitation with respect to form of the anthraguinone red. There is no specific limitation with respect to mean size of the anthraquinone red. It is preferred that the mean size is within 0.01-2 μm, more preferably 0.05-1.5 μm, and most preferably 0.1-1 μm. There is no specific limitation with respect to pH of the anthraquinone red. Preferred is pH 4-9.

The white pigment and colored pigment can be added directly, or in the form of a master batch. Technology of master batch utilizing a pigment and a resin component is already known.

A black pigment such as carbon black or iron black can be optionally added to the pulverized resin product. The black pigment can impart a high light-insulating property to the reclaimed resin articles. The black pigments can be employed in combination of two or more.

As for the carbon black, any of known carbon black pigments can be employed without no specific limitations. For instance, carbon black, acetylene black, lamp black, channel black, or ketchen black produced by the furnace process or channel process can be employed. The carbon black can be subjected to oxidation processing. Preferred is a furnace black produced by the furnace process, because it has good uniform appearance, good dispersability, and blackness and increased gloss of the resulting molded article. There is no specific limitation with respect to mean size of the carbon black. It is preferred that the mean size is within 0.001-0.3 μm, more preferably 0.005-0.2 μm, more preferably 0.01-0.1 μm, and most preferably 0.01-0.03 μm, because a carbon black of such mean size is excellent in dispersability and handling, and moreover provides high blackness and high glossiness.

The iron black can be a black iron oxide produced by the firing method. There is no specific limitation with respect to the form of the iron black. Iron black having a polyhedral form such as an octahedral form or a globular form can be used. Preferred is an octahedral iron black. There is no specific limitation with respect to mean size of the iron black. It is preferred that the mean size is within 0.05-0.4 μm, more preferably 0.15-0.35 μm, and most preferably 0.2-0.35 μm. There is no specific limitation with respect to DOP absorption of the iron black. It is preferred that the DOP absorption is within 10-80 cc/100 g, more preferably 15-50 cc/100 g, more preferably 20-40 cc/100 g, and most preferably 25-30 cc/100 g. There is no specific limitation with respect to pH of the iron black. Preferred is pH 9-11, and pH 9-10 is more preferred.

A filler can be optionally added to the pulverized resin product, and the addition of a filler is preferred for improving physical properties of the resulting reclaimed resin articles. The fillers can be employed in combination of two or more.

The filler can be organic fillers or inorganic fillers other than the pigments. Examples of the inorganic fillers include talc, clay, mica, silica, diatomaceous earth, magnesium aluminate, montmorillonite, bentonite, dolomite, dosonite, silicates, carbon fibers, glasses (including glass fibers), barium ferrite, beryllium oxide, aluminum hydroxide, magnesium hydroxide, basic magnesium carbonate, calcium carbonate, magnesium carbonate, magnesium sulfate, calcium sulfate, barium sulfate, ammonium sulfate, calcium sulfite, calcium silicate, molybdenum sulfite, zinc borate, barium methaborate, calcium borate, sodium borate, metals such as zinc, copper, iron, lead, aluminum, nickel, chromium, titanium, manganese, tin, platinum, tungsten, gold, magnesium, cobalt, and strontium, oxides of these metals, stainless steel, solder, metal alloy such as brass, powders of metallic ceramics such as silicon carbide, silicon nitride, zirconia, aluminum nitride, titanium carbide, whiskers, and fibers. The fibers and whiskers preferably have L/D of not lower than 10, more preferably not lower than 15. The fibers preferably has a length of 0.1 to 5 mm, more preferably 1 to 5 mm. The width of the fiber preferably is not more than 30 μm, more preferably 1-30 μm, most preferably 1-15 μm. Particularly, the carbon fiber preferably has a length of 0.1 to 5 mm, more preferably 1 to 5 mm, and a width of not more than 30 μm, more preferably 1-30 μm, and most preferably 1-15 μm.

As the filler, an inorganic filler is preferred, and talc is most preferred.

In the method of reclaiming the synthetic resin product, additives and dispersants such as lubricants, anti-static agents, surfactants, nucleating agents, ultra-violet ray absorbers, oxidation inhibitors, and flame retardants can be employed.

Examples of the dispersants include higher fatty acids, higher fatty acidamide, metal soaps, glycerol esters, hydrotalcite, polyethylene wax, and polypropylene wax.

Examples of the additives include oxidation inhibitors of phenol type, phosphorus type, and sulfur type, benzophenone, benzotriazole, ultraviolet ray absorbers such as HALS, and flame retardants of phosphorus type and halogen types.

As described before, a thermoplastic resin and/or an elastomer can be employed in the method of the invention for reclaiming the pulverized synthetic resin product. The thermoplastic resin and elastomer to be employed preferably is the same as or an equivalent to those contained in the resin product.

Accordingly, examples of the thermoplastic resin materials employable in the method of reclaiming the pulverized resin product are olefinic resins (e.g., high density polyethylene, low density polyethylene, crystalline polypropylene), polycarbonate resins, polyurethane resins, styrene resins, ABS resins (acrylonitrile-butadiene-styrene resins), polyester resins such as polybutylene terephthalate and polyethylene terephthalate, polyphenyl ether resins such as modified polyphenylene ether and polyphenylene sulfide, polyacryl resins such as poly (methyl methacrylate), polyamides such as 6-nylon, 66-nylon, 12-nylon, and 6,12-nylon, and polysulfones.

In the method of the invention for producing particles of reclaimed resin material, the pulverized synthetic resin product is mixed with appropriate amounts of a white pigment and a colored pigment, and optionally, with a thermoplastic resin and an elastomer, and subsequently the resulting mixture is melted and kneaded. The amounts of these pigments can be determined in consideration of the degree of coloring (such as black or gray) of the pulverized resin product. Thereafter, the kneaded material is processed to obtain specimen directly or via reclaimed resin particles. The obtained specimen is subjected to visual observation or observation using a testing apparatus for examining color hue or appearance. If desired, certain physical properties are measured to examine whether the amounts of the employed additives are appropriate or not. Based on the examination, the preparation of specimen of reclaimed resin product is repeated with varying the natures and amounts of the additives to obtain a reclaimed resin product having the desired coloring.

There are no specific limitations with respect to the procedures and apparatuses for mixing the pulverized resin product and additives. Mixers and/or kneaders such as known single worm extruders (or kneaders), dual worm extruders (or kneader), tandem kneading apparatuses comprising a dual worm extruder and a single worm extruder (or kneader) combined in series, calenders, banbury mixers, kneading rolls, barbender plastgraphs, or kneaders can be employed.

The colored reclaimed resin particles can be processed by known molding procedures such as extrusion molding, sheet formation molding, injection molding, injection-compression molding, gas injection molding, blow molding, or vacuum molding, to give reclaimed articles such as interior or exterior parts of automobiles such as bumpers, plastic material parts, door trims, instrument panel, trims, console boxes, parts of engine room of automobiles such as batteries and fan shrouds, interior or exterior parts of household electric appliances, interior or exterior parts of house, or articles employable as buffer materials or packing materials. According to the method of the invention for reclaiming plastic materials can give molded articles having a glossy surface, embossed articles, articles having color patterns, and articles having a smoothly embossed pattern.

Examples embodying the invention are given hereinbelow. In the examples, the lightness and hue of the molded articles (specimen) are measured by the following procedures.

Procedures for measurement: The embossed surface of the specimen is subjected to measurements of "Lightness $L^*$", "Hue $a^*$" and "Hue $b^*$" (CIE 1976), by means of a spectrophotometer (light source: D-65, viewing angle: 10°) available from Kurashiki Spinning Co., Ltd.

EXAMPLES 1-9

(1) Synthetic Resin Product to be Reclaimed

A bumper product having been recovered from a used automobile (colored with black pigment, from which a coating film was removed) and pulverized to give chips of 5-10 mm was employed as a waste plastic material.

The pulverized bumper had a melt flow rate (MER) of 28.6 g/10 min. (measured according to ASTM D1238, at a temperature of 230° C. and a weight of 2.16 kg) and comprised approx. 60 weight parts of crystalline polypropylene, approx. 30 weight parts of elastomers (a mixture of EPR and other elastomers), approx. 10 weight parts of talc, approx. 2-4 weight parts of a coating film (a mixture of urethane resin and melamine resin, a mixture of chips of white, silver, red-silver, green-silver, gold, light blue, and dark blue), and approx. 0.5-1 weight part of a pigment mixture containing carbon black, titanium dioxide, and other pigments.

(2) Additive Materials

1) Polypropylene: crystalline polypropylene (homo, melt flow rate (MFR): 30 g/10 min., pendant ratio: 96.0%)

2) Elastomer: ethylene-propylene copolymer (Mooney viscosity: $ML_{1+4}$(100° C.): 35, ethylene content: 72 wt. %)

3) Talc having a mean diameter of 2.7 μm (laser diffraction method)

4) Iron oxide black having a mean diameter of 0.27 μm, a DOP absorption of 26-30 cc/200 g, and pH 9-10

5) Carbon black having a mean diameter of 0.017 μm (prepared by furnace process)

6) Titanium dioxide having a mean diameter of 0.22 μm, a DOP absorption of 14 cc/100 g, and pH 5.5-7.5

7) Titanium yellow having a mean diameter of 0.91 μm, a DOP absorption of 25 cc/100 g, and pH 7.8

8) Ultramarine blue A having a mean diameter of 1-3 μm, a DOP absorption of 31-33 cc/100 g, and pH 8.5-10.5

9) Phthalocyanine blue belonging to α-type

10) Phthalocyanine green belonging to α-type and having a DOP absorption of 39.3 cc/10 g and pH 7

11) Iron oxide red having a mean diameter of 0.16 μm, a DOP absorption of 23 cc/100 g, and pH 5-7

12) Quinacridone red belonging to β-type and having pH 8.5-9.5

13) Anthraquinone red having a DOP absorption of 54 cc/100 g and pH 5.5-8.5

14) Oxidation inhibitor: IRGANOX 1010 (0.05 weight part) and IRGAFOS 168 (0.05 weight part) were employed in all examples.

15) HALS additive: Sanol LS770 (0.2 weight part) was employed in all examples.

16) Dispersant: calcium stearate (0.1 weight part) was employed in all examples.

(3) The Additives were Blended in a Tumbler Mixer (available from Platech Co., Ltd.) under dry condition and kneaded in a twin screw extruder (UME 40-48T, available from Ube Industries, Ltd.) under the conditions of L/D=47.7, barrel temperature: 200° C., 20 mesh screen pack, and processing rate: 60 kg/hr., to give pellets.

In each example, the total amount of the waste plastic material, polypropylene, elastomer and talk was set to 100 weight parts (waste plastic material: 77 wt. %, polypropylene: 15 wt. %, elastomer: 3 wt. %, talc: 5 wt. %).

The pellets were placed in an injection molding machine (metal mold: square plate (100 mm×100 mm×3 mm, embossing) under the following conditions, to give specimen:

molding temperature: 180° C., 190° C., 200° C., 210° C.
molding pressure: P1-P2-P3-P4=108-98-88-78 (MPa)
molding rate: V1-V2-V3-V4=30-30-20-20 (%)
screw back pressure: free
screw rotation: 60%
mold temperature: 40° C.
cycle: injection: 10 sec., and cooling: 20 sec.
shot conditions: continuous 10 shots, specimen of 6th to 10th shots were employed for the measurements.

The molded products (specimen) were subjected to measurements of lightness and hue. In Table 1, the additive (amount in terms of weight part) and the results of evaluation are shown.

TABLE 1

Specimen prepared from waste plastic material
$L^*$: 25.55, $a^*$: −0.19, $b^*$: −0.52
Hue of waste plastic material (visual observation): black

| | |
|---|---|
| Example 1: | Pigment [titanium dioxide (0.3), titanium yellow (0.06), phthalocyanine green (0.01)]<br>Reclaimed resin: $L^*$: 29.05, $a^*$: −0.11, $b^*$: −1.23<br>Hue of reclaimed resin (visual observation): bluish dark gray |
| Example 2: | Pigment [titanium dioxide (2.3), ultramarine blue A (0.07), iron oxide red (0.01)]<br>Reclaimed resin: $L^*$: 49.05, $a^*$: −0.51, $b^*$: −2.59<br>Hue of reclaimed resin (visual observation): bluish light gray |
| Example 3: | Pigment [titanium dioxide (0.78), phthalocyanine blue (0.11), quinacridone red (0.05)]<br>Reclaimed resin: $L^*$: 31.12, $a^*$: −1.33, $b^*$: −4.89<br>Hue of reclaimed resin (visual observation): dark purplish blue |
| Example 4: | Pigment [titanium dioxide (1.2), phthalocyanine blue (0.035), phthalocyanine green (0.06)]<br>Reclaimed resin: $L^*$: 34.61, $a^*$: −2.29, $b^*$: −3.34<br>Hue of reclaimed resin (visual observation): dark grayish yellow green |

TABLE 1-continued

Specimen prepared from waste plastic material
$L^*$: 25.55, $a^*$: −0.19, $b^*$: −0.52
Hue of waste plastic material (visual observation): black

| | |
|---|---|
| Example 5: | Pigment [titanium dioxide (1.26), titanium yellow (1.08), iron oxide red (0.08)]<br>Reclaimed resin: $L^*$: 45.30, $a^*$: 1.01, $b^*$: 5.68<br>Hue of reclaimed resin (visual observation): grayish yellow |
| Example 6: | Pigment [titanium dioxide (1.92), titanium yellow (1), iron oxide red (0.087)]<br>Reclaimed resin: $L^*$: 57.58, $a^*$: 2.43, $b^*$: 9.00<br>Hue of reclaimed resin (visual observation): reddish yellowish pale gray |
| Example 7: | Pigment [titanium dioxide (0.37), titanium yellow (0.06), phthalocyanine green (0.02), iron black (0.5)]<br>Reclaimed resin: $L^*$: 28.63, $a^*$: −0.08, $b^*$: −1.21<br>Hue of reclaimed resin (visual observation): bluish dark gray |
| Example 8: | Pigment [titanium dioxide (0.58), titanium yellow (0.19), phthalocyanine green (0.02), carbon black (0.2)]<br>Reclaimed resin: $L^*$: 29.44, $a^*$: 0.05, $b^*$: −0.98<br>Hue of reclaimed resin (visual observation): bluish dark gray |
| Example 9: | Pigment [titanium dioxide (1.1), titanium yellow (0.9), iron oxide red (0.155), carbon black (0.05)]<br>Reclaimed resin: $L^*$: 39.31, $a^*$: 1.57, $b^*$: 3.55<br>Hue of reclaimed resin (visual observation): grayish reddish yellow |

EXAMPLES 10-15

(1) Synthetic Resin Product to be Reclaimed

A waste polyethylene resin material which was produce for industrial uses and was colored with a black pigment was employed as a waste plastic material.

(2) The 100 weight parts of the waste polyethylene resin material and additives were blended in a tumbler mixer (available from Platech Co., Ltd.) under dry condition and kneaded in a twin screw extruder (UME 40-48T, available from Ube Industries, Ltd.) under the conditions of L/D=47.7, barrel temperature: 100° C., die head: 180° C., 100 mesh screen pack, and processing rate: 35 kg/hr., to give pellets.

The pellets were placed on a hot plate and molded (clamp pressure: 40 t, spacer: 100 mm×100 mm×1 mm, heating temperature: 230° C., pressure: 100 kg/cm$^2$, cooling temperature: 20° C., cooling period: 2 min.), to give specimen.

The specimen were subjected to measurements of lightness and hue. In Table 2, the additive (amount in terms of weight part) and the results of evaluation are shown.

TABLE 2

Specimen prepared from waste plastic material
$L^*$: 25.52, $a^*$: 0.31, $b^*$: 0.33
Hue of waste plastic material (visual observation): black

| | |
|---|---|
| Example 10: | Pigment [titanium dioxide (2.55), titanium yellow (0.54), phthalocyanine green (0.09)]<br>Reclaimed resin: $L^*$: 52.21, $a^*$: 1.16, $b^*$: 2.36<br>Hue of reclaimed resin (visual observation): reddish yellowish medium gray |
| Example 11: | Pigment [titanium dioxide (0.75), phthalocyanine blue (0.24), quinacridone red (0.09), carbon black (0.05)]<br>Reclaimed resin: $L^*$: 28.21, $a^*$: −1.01, $b^*$: −4.57<br>Hue of reclaimed resin (visual observation): strong blue |

TABLE 2-continued

Specimen prepared from waste plastic material
L*: 25.52, a*: 0.31, b*: 0.33
Hue of waste plastic material (visual observation): black

| | |
|---|---|
| Example 12: | Pigment [titanium dioxide (1.45), phthalocyanine blue (0.03), phthalocyanine green (0.12), carbon black (0.05)]<br>Reclaimed resin: L*: 35.24, a*: −3.35, b*: −3.42<br>Hue of reclaimed resin (visual observation): grayish blue green |
| Example 13: | Pigment [titanium dioxide (1.20), titanium yellow (0.12), iron oxide red (0.39), carbon black (0.05)]<br>Reclaimed resin: L*: 35.22, a*: 2.45, b*: 0.08<br>Hue of reclaimed resin (visual observation): grayish red |
| Example 14: | Pigment [titanium dioxide (0.65), titanium yellow (0.55), iron oxide red (0.12), carbon black (0.05)]<br>Reclaimed resin: L*: 31.86, a*: 0.81, b*: 0.82<br>Hue of reclaimed resin (visual observation): dark grayish purple |
| Example 15: | Pigment [titanium dioxide (2.10), titanium yellow (0.98), iron oxide red (0.05)]<br>Reclaimed resin: L*: 61.68, a*: 1.90, b*: 11.26<br>Hue of reclaimed resin (visual observation): reddish yellowish pale gray |

EXAMPLES 16-21

(1) Synthetic Resin Product to be Reclaimed

A waste polyamide resin material which was produce for industrial uses and was colored with a black pigment, and contained 20 wt. % of carbon fibers was employed as a waste plastic material.

(2) The 100 weight parts of the waste polyamide resin material and additives (shown in Table 3) were blended in a tumbler mixer (available from Platech Co., Ltd.) under dry condition and kneaded in a twin screw extruderr (UME 40-48T, available from Ube Industries, Ltd.) under the conditions of L/D=47.7, barrel temperature: 260° C., and processing rate: 40 kg/hr., to give pellets.

The pellets were placed in an injection molding machine (metal mold: square plate (100 mm×100 mm×3 mm, skin drawing) under the following conditions, to give specimen:
  molding temperature: 270° C., 280° C., 280° C., 280° C.
  molding pressure: P1-P2-P3-P4=108-98-88-78 (MPa)
  molding rate: V1-V2-V3-V4=30-30-20-20 (%)
  screw back pressure: free
  screw rotation: 60%
  mold temperature: 80° C.
  cycle: injection: 10 sec., and cooling: 20 sec.
  shot conditions: continuous 10 shots, specimen of 6th to 10th shots were employed for the measurements.

The specimen were subjected to measurements of lightness and hue. In Table 3, the additive (amount in terms of weight part) and the results of evaluation are shown.

TABLE 3

Specimen prepared from waste plastic material
L*: 24.98, a*: 0.13, b*: 0.28
Hue of waste plastic material (visual observation): black

| | |
|---|---|
| Example 16: | Pigment [titanium dioxide (2.75), titanium yellow (0.71), phthalocyanine green (0.11)]<br>Reclaimed resin: L*: 51.97, a*: 1.21, b*: 2.55<br>Hue of reclaimed resin (visual observation): reddish yellowish medium gray |
| Example 17: | Pigment [titanium dioxide (0.92), phthalocyanine blue (0.28), carbon black (0.05)]<br>Reclaimed resin: L*: 28.18, a*: −1.06, b*: −4.46<br>Hue of reclaimed resin (visual observation): deep blue |
| Example 18: | Pigment [titanium dioxide (1.55), phthalocyanine blue (0.05), phthalocyanine green (0.15), carbon black (0.05)]<br>Reclaimed resin: L*: 35.11, a*: −3.22, b*: −3.48<br>Hue of reclaimed resin (visual observation): grayish blue green |
| Example 19: | Pigment [titanium dioxide (1.4), titanium yellow (0.15), iron oxide red (0.42), carbon black (0.05)]<br>Reclaimed resin: L*: 35.47, a*: 2.51, b*: 0.14<br>Hue of reclaimed resin (visual observation): grayish red |
| Example 20: | Pigment [titanium dioxide (0.82), titanium yellow (0.71), iron oxide red (0.14), carbon black (0.05)]<br>Reclaimed resin: L*: 32.03, a*: 0.85, b*: 0.84<br>Hue of reclaimed resin (visual observation): dark grayish purple |
| Example 21: | Pigment [titanium dioxide (2.35), titanium yellow (1.07), iron oxide red (0.06)]<br>Reclaimed resin: L*: 61.36, a*: 1.93, b*: 10.85<br>Hue of reclaimed resin (visual observation): reddish yellowish pale gray |

UTILIZATION IN INDUSTRY

According to the present invention, waste plastic products comprising as a main component a thermoplastic resin such as polypropylene resin can be effectively reclaimed.

The method of the invention for reclaiming waste plastic material enable to prepare colored resin products (other than black resin products) by utilizing a combination of a light-shielding white pigment and an optionally selected colored pigment. If desired, the reclaimed resin product can have a color other than the color of the starting waste plastic material. Accordingly, the method is particularly advantageous for recycling waste plastic material.

What is claimed is:

1. A method for producing colored reclaimed resin particles which comprises the steps of:
  mixing 100 weight parts of a pulverized thermoplastic resin product to be reclaimed with 0.01 to 20 weight parts of a white pigment and 0.01 to 20 weight parts of a colored pigment to give a mixture, wherein the pulverized thermoplastic resin product comprises carbon black and a plastic component comprising a thermoplastic resin component and an elastomer component, the carbon black being contained in an amount of not more than 2 weight parts per 100 weight parts of the plastic component, or wherein the pulverized thermoplastic resin product comprises a mixture of a pulverized resin product comprising carbon black and a plastic component comprising a thermoplastic resin component and an elastomer component, the carbon black being contained in an amount of not more than 2 weight parts per 100 weight parts of the plastic component, and a pulverized thermoplastic product containing a colored pigment, or wherein the pulverized thermoplastic resin product contains two or more different colored pigments;

heating the mixture to give a molten product; and converting the molten product into solid particles having color characteristics of $L^*=28.00$ to $68.00$.

2. The method of claim 1, in which the white pigment is titanium dioxide.

3. The method of claim 1, in which at least one of a black pigment, an inorganic filler, a thermoplastic resin, and an elastomer component is further mixed to give the molten product.

4. The method of claim 1, in which the pulverized thermoplastic resin product to be reclaimed comprises at least one of polyolefin, polyester, polystyrene, ABS resin and polyamide.

5. A method for producing colored reclaimed resin particles which comprises the steps of:

mixing 100 weight parts of a pulverized thermoplastic resin product to be reclaimed with 0.01 to 20 weight parts of a white pigment and 0.01 to 20 weight parts of a colored pigment to give a mixture, wherein the pulverized thermoplastic resin product comprises carbon black and a plastic component comprising a thermoplastic resin component, the carbon black being contained in an amount of not more than 2 weight parts per 100 weight parts of the plastic component, or wherein the pulverized thermoplastic resin product comprises a mixture of a pulverized resin product comprising carbon black and a plastic component comprising a thermoplastic resin component, the carbon black being contained in an amount of not more than 2 weight parts per 100 weight parts of the plastic component, and a pulverized thermoplastic product containing a colored pigment, or wherein the pulverized thermoplastic resin product contains two or more different colored pigments;

heating the mixture to give a molten product; and converting the molten product into solid particles having color characteristics of $L^*=28.00$ to $68.00$.

6. The method of claim 5, in which the white pigment is titanium dioxide.

7. The method of claim 5, in which at least one of a black pigment, an inorganic filler, a thermoplastic resin, and an elastomer component is further mixed to give the molten product.

8. The method of claim 5, in which the pulverized thermoplastic resin product to be reclaimed comprises at least one of polyolefin, polyester, polystyrene, ABS resin and polyamide.

9. A method for producing a colored reclaimed molten product which comprises the steps of:

mixing 100 weight parts of a pulverized thermoplastic resin product to be reclaimed with 0.01 to 20 weight parts of a white pigment and 0.01 to 20 weight parts of a colored pigment to give a mixture, wherein the pulverized thermoplastic resin product comprises carbon black and a plastic component comprising a thermoplastic resin component, the carbon black being contained in an amount of not more than 2 weight parts per 100 weight parts of the plastic component, or wherein the pulverized thermoplastic resin product comprises a mixture of a pulverized resin product comprising carbon black, and a plastic component comprising a thermoplastic resin component, the carbon black being contained in an amount of not more than 2 weight parts per 100 weight parts of the plastic component and a pulverized thermoplastic product containing a colored pigment, or wherein the pulverized thermoplastic resin product contains two or more different colored pigments; and heating the mixture to give a molten product.

10. The method of claim 9, in which the molten product gives an article having color characteristics of $L^*=28.00$ to $68.00$.

* * * * *